United States Patent [19]
Brand

[11] Patent Number: 5,186,222
[45] Date of Patent: Feb. 16, 1993

[54] FUEL SPILLAGE CONTROL APPARATUS

[76] Inventor: Randolf W. Brand, P.O. Box 80828, Fairbanks, Ak. 99708

[21] Appl. No.: 638,322

[22] Filed: Jan. 7, 1991

[51] Int. Cl.[5] .............................. F16L 5/00; B65B 3/06
[52] U.S. Cl. ............................ 141/86; 141/311.00 A; 141/285; 141/286; 141/113; 141/230
[58] Field of Search .................... 141/86, 311 A, 113, 141/35, 285, 230, 286

[56] References Cited

U.S. PATENT DOCUMENTS

| | | |
|---|---|---|
| 1,352,792 | 4/1920 | Day . |
| 1,992,151 | 2/1935 | Woodbridge . |
| 3,739,937 | 6/1973 | Stock .............................. 141/286 X |
| 3,927,702 | 12/1975 | Ingle et al. ........................ 141/285 |
| 4,094,346 | 6/1978 | Milo ................................. 141/286 |
| 4,278,115 | 7/1981 | Briles et al. ........................ 141/86 |
| 4,410,100 | 10/1983 | Simmons . |
| 4,593,714 | 6/1986 | Madden ........................... 141/86 X |
| 4,615,362 | 10/1986 | Hachman et al. .................. 141/86 |
| 4,637,522 | 1/1987 | Klop . |
| 4,706,718 | 11/1987 | Milo ................................. 141/86 |
| 4,762,440 | 8/1988 | Argandona ..................... 141/86 X |
| 4,763,806 | 8/1988 | Podgers et al. ................. 141/86 X |
| 4,854,469 | 8/1989 | Hargest . |
| 4,986,436 | 1/1991 | Bambacigno et al. ............ 141/86 x |

OTHER PUBLICATIONS

Brochure-The Cantainer, Wigdahl, Gore & Associates.
705 Flex Catch brochure, E. R. W. of Muskegon, Michigan.

*Primary Examiner*—Ernest G. Cusick
*Attorney, Agent, or Firm*—Graybeal Jackson Haley & Johnson

[57] ABSTRACT

A liquid spillage control apparatus contains liquid from overfilling of a liquid tank and allows venting of volatile vapors. A liquid spill transfer pipe allows passage of liquid overflow into the liquid holding chamber. A liquid drain pipe communicates with the liquid spill transfer pipe in the liquid holding chamber and drains liquid of a predetermined level or greater out of the liquid holding chamber through the liquid spill transfer pipe. A liquid-buoyant drain pipe sealing means closes the liquid drain pipe when the liquid level in the liquid drain pipe reaches the liquid drain pipe inlet. An orifice in the bottom of the liquid holding chamber allows draining of liquids and solids heavier than the liquid from the liquid holding chamber.

33 Claims, 2 Drawing Sheets

FUEL SPILLAGE CONTROL APPARATUS

BACKGROUND OF THE INVENTION

The present invention generally pertains to fuel spillage control devices. Specifically, this invention pertains to an apparatus for retaining fuel within an enclosed chamber, the fuel emanating from the ventilation opening of a fuel tank.

Fuel storage units commonly employed for residential energy and heating needs include a fuel tank, a fill pipe, and a ventilation opening. To replenish the fuel in these fuel storage units, the nozzle of the filling device (a mobile fuel tanker truck or the like) is inserted into the fill pipe communicating with the fuel tank.

As the fuel tank of the fuel storage unit is filled, air is vented out of the fuel tank's vent opening. When the fuel tank is full and an automatic shut-off switch is present on the nozzle, the fuel will stop flowing out of the nozzle when the fuel fills the fuel fill pipe. However, prior to this automatic shut-off, fuel will flow out of the fuel receptacle's vent opening, thus polluting the environment.

If the nozzle of the filling device does not have an automatic shut-off switch, the fuel attendent shuts off fuel flow manually, often upon observation of the fuel flowing out of the fuel receptacle's vent opening and into the environment.

Fuel receptacles adapted to be attached to the ventilation openings of fuel tanks are generally known. However, these devices suffer from venting of fuel into the environment through their own vent openings, contamination of the fuel in the fuel tank due to dirt and water entering their vent openings, the inability to automatically return fuel in the device to the fuel tank for use, and the inability to separate contaminates from the fuel in the device prior to returning it to the fuel tank.

SUMMARY OF THE INVENTION

The present invention provides a fuel spillage control apparatus having a fuel holding chamber, a vent orifice, and a fuel spill transfer pipe. The fuel spill transfer pipe connects the fuel holding chamber to the vent pipe of a fuel tank. Overflow fuel passe through the fuel spill transfer pipe and is collected in the fuel holding chamber. The fuel spill transfer pipe inlet has a cross-sectional area less than that of the fill pipe of the fuel tank. The apparatus is adapted to be attached to the fuel tank such that the outlet of the fuel spill transfer pipe is lower than the inlet of the fill pipe so that fuel level equalization between the fuel in the fill pipe and the fuel in the fuel spill transfer pipe results in fuel flow out of the fuel spill transfer pipe, as opposed to out of the fill pipe.

In a preferred embodiment of the present invention, the outlet of the fuel spill transfer pipe is oriented at an acute angle relative to the fuel spill transfer pipe inlet, the cross-sectional area of the outlet is less than that of the inlet, and a diffuser on the end of the outlet particulates fuel passing out of the outlet.

In another preferred embodiment, a fuel drain pipe communicates with the fuel spill transfer pipe in the fuel holding chamber and drains fuel of a predetermined level or greater into the fuel tank through the fuel spill transfer pipe. The inlet of the fuel drain pipe is preferably oriented substantially perpendicularly to the outlet of the fuel drain pipe. Additionally, the cross-sectional area of the fuel drain pipe inlet is preferably less than the cross-sectional area of the fuel drain pipe outlet. A fuel-buoyant drain pipe sealing means, preferably a sphere having a cross-sectional area greater than the fuel drain pipe inlet but less than the fuel drain pipe outlet, is located within the fuel drain pipe. This fuel-buoyant drain pipe sealing means closes the fuel drain pipe during fuel flow into the fuel spill transfer pipe when the fuel level in the fuel drain pipe reaches the fuel drain pipe inlet. Fuel cannot enter either the fuel drain pipe or the fuel spill transfer pipe while the fuel-buoyant drain pipe sealing means blocks the fuel drain pipe inlet, and fuel-based contaminants settle to the bottom of the fuel holding chamber. When the fuel level in the fuel drain pipe decreases due to fuel consumption from the fuel tank, the fuel buoyant drain pipe sealing means is unseated from the inlet of the fuel drain pipe, and fuel flows through the fuel drain pipe and the fuel spill transfer pipe and into the fuel tank.

In a preferred embodiment, an orifice is located in the bottom of the fuel holding chamber to drain liquid and solid contaminants heavier than the fuel from the fuel holding chamber.

In another preferred embodiment, the top of the fuel holding chamber is conic-shaped and the vent orifice in the fuel holding chamber is covered with mesh.

BRIEF DESCRIPTION OF THE DRAWINGS

These and other features of the present invention will be more fully appreciated when considered in light of the following specification and drawings in which.

DETAILED DESCRIPTION OF THE PREFERRED EMBODIMENT

The present invention is a fuel spillage control apparatus adapted to be attached to the ventilation opening or pipe of a fuel tank that also has a fill pipe.

Figure 1:
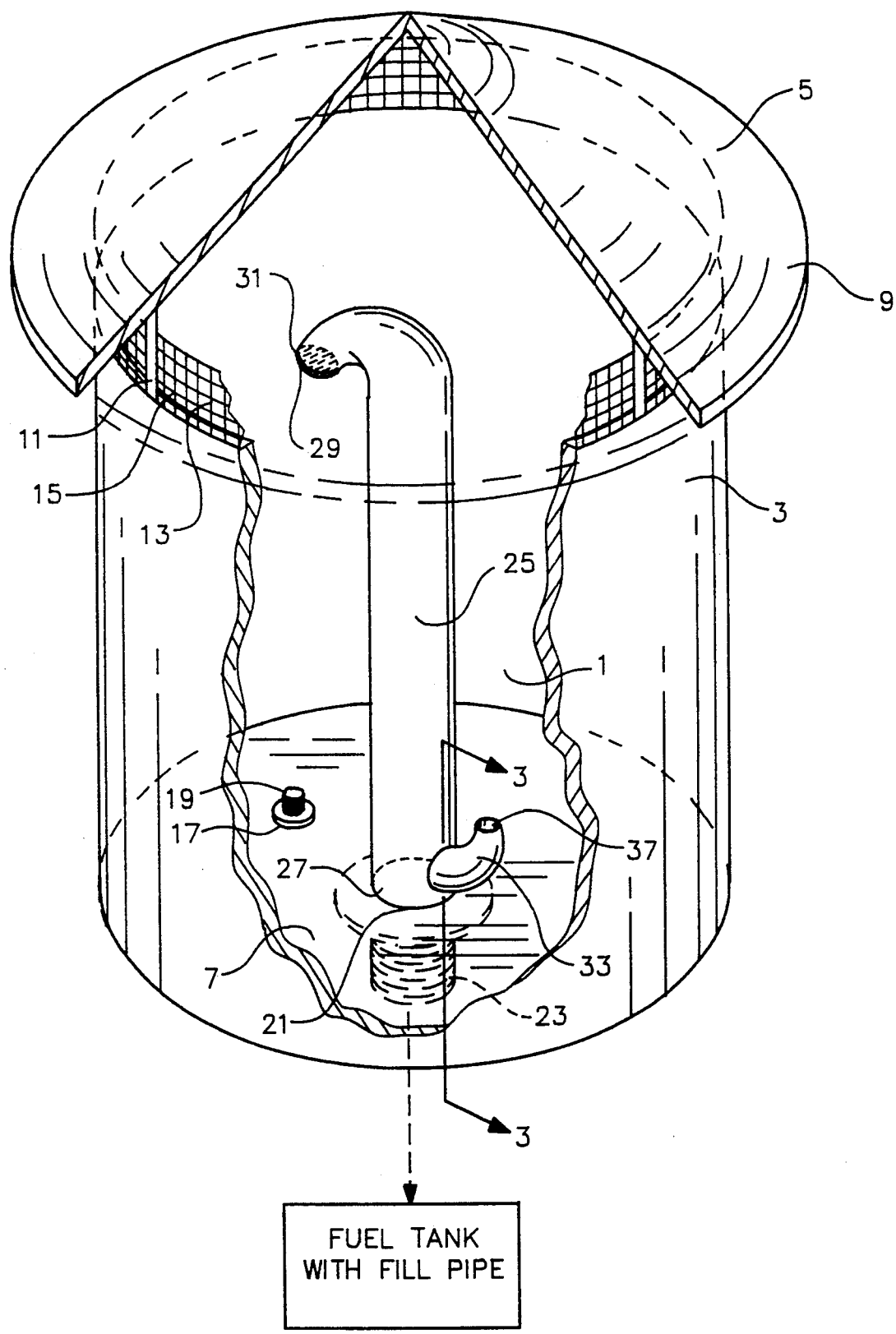
FIG. 1 is an isometric view of a preferred embodiment of the present invention.
Figure 2:
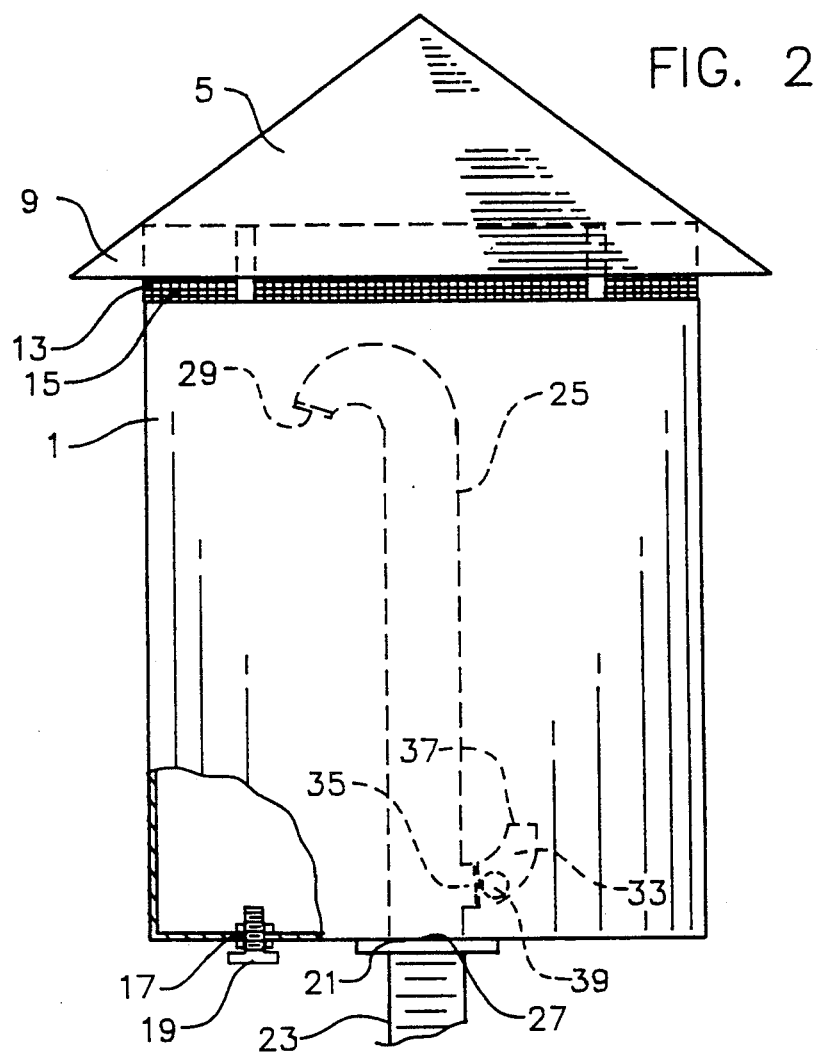
FIG. 2 is a cross-sectional view of the preferred embodiment of FIG. 1 taken along line 2—2.

Referring to FIGS. 1 and 2, the fuel spillage control apparatus of the present invention includes fuel holding chamber 1 having sides 3, top 5, and bottom 7. Fuel holding chamber 1 may be made out of any durable, non-corrosive material such as steel or plastic. Fuel holding chamber 1 is shown in a cylindrical embodiment, but it may also be square or rectangular, for example. Top 5 of fuel holding chamber 1 is preferably sloped (for example, a conical structure) and has eaves 9 extending over the sides 3 to facillitate the drainage of rain and other moisture off of the exterior of fuel holding chamber 1. Top 5 is preferably attached to sides 3 by a plurality of rods 11 welded, screwed, bolted or riveted to top 5 and sides 3.

Vent opening 13 is preferably an annular space between top 5 and sides 3 of fuel holding chamber 1. Vent opening 13 allows displaced fuel vapor to escape fuel holding chamber 1 as the fuel tank is filled with fuel, thus preventing a pressure build-up in fuel holding chamber 1.

Mesh 15 is located over vent opening 13 and prevents external solid contaminants from entering fuel holding chamber 1. Mesh 15 is preferably comprised of steel wire and is attached to top 5 and sides 3 with adhesives or by welding.

Contaminant drain opening 17 is located in bottom 7 of fuel holding chamber 1. Plug 19 seals contaminant drain opening 17. Upon removal of plug 19, liquid or solid fuel contaminants that have settled out of fuel in fuel holding chamber 1 are drained through drain opening 17 to minimize the contaminants in fuel returned to the fuel tank from fuel holding chamber 1.

Bottom 7 of fuel holding chamber 1 also includes fuel spill opening 21. Fuel holding chamber 1 is connected in a fluid-tight manner to the vent pipe 23 of the fuel tank at fuel spill opening 21, preferably through threaded attachment or by welding.

The cross-sectional area of fuel spill opening 21 is less than the cross-sectional area of the fill pipe of the fuel tank so that, when the fuel tank is full, fuel will flow up into the fill pipe, thus triggering the automatic shut-off switch of the fuel fill nozzle if present. If the cross-sectional area of fuel spill opening 21 is greater than that of the fill pipe, fuel will not flow up into the fill pipe and trigger the shut-off switch when the fuel tank is full, but will instead flow through fuel spill opening 21, filling fuel holding chamber 1 and spilling through vent opening 13 into the external environment. For optimum functioning, fuel spill opening 21 should have a cross-sectional area between 40% to 60% less than the cross-sectional area of the fill pipe. However, the present invention will function as long as the cross-sectional area of fuel spill opening 21 is less than that of the fill pipe. In the most preferred embodiment, fuel spill opening 21 has a diameter of 1½ inches when the fill pipe has a diameter of 2 inches. Preferably, the diameter of fuel spill opening 21 (and of inlet 27 and outlet 29 of fuel transfer pipe 25, discussed below) should not be less than 1½ inches or excessive vapor back pressure will occur as fuel fills the fuel tank at an average rate of 60 gallons per minute.

Fuel spill transfer pipe 25 is connected to fuel spill opening 21 in a fluid-tight manner, preferably by welding or adhesive. Overflow fuel from the vent pipe of the fuel tank passes through fuel spill opening 21 and fuel spill transfer pipe 25, and into fuel holding chamber 1. The inlet 27 of fuel spill transfer pipe 25 is preferably sized to match the cross-sectional area of fuel spill opening 21 (i.e., less than the cross-sectional area of the fill pipe). The outlet 29 of fuel spill transfer pipe 25 preferably has a cross-sectional area less than that of inlet 27 and fuel spill opening 21. In the preferred embodiment, the cross-sectional area of outlet 29 is between 40% to 60%, and most preferably is 44%, of the cross-sectional area of the fill pipe of the fuel tank.

In an alternate embodiment of the present invention, the cross-sectional area of either one of fuel spill opening 21 or the inlet 27 of fuel spill transfer pipe 25 is less than that of the fill pipe (preferably 40%–60% less, most preferably 44% the cross-sectional area of outlet 29 of fuel spill transfer pipe 25 is not necessarily less than the cross-sectional areas of inlet 27 and fuel spill opening 21.

In yet another alternate embodiment of the present inventions, the cross-sectional area of outlet 29 of fuel spill transfer pipe 27 is less than that of the fill pipe (preferably 40%–60% less, most preferably 44% less), but the cross-sectional area of inlet 27 of fuel spill transfer pipe 25 and of fuel spill opening 21 are not necessarily less than the cross-sectional area of the fill pipe.

In sum, as long as one of the fuel spill opening 21, the inlet 27 of fuel transfer pipe 25, and the outlet 29 of fuel transfer pipe 25 is less than the cross-sectional area of the fill pipe (preferably 40%–60% less, most preferably 44% less), the requisite flow of fuel up into the fill pipe will occur when the fuel tank is full.

Fuel spill transfer pipe 25 is preferably curved such that outlet 29 is oriented at an acute angle relative to inlet 27. This orientation of outlet 29 guides overflow fuel passing through fuel spill transfer pipe 25 to bottom 7 of fuel holding chamber 1, thus preventing violent fuel flow from escaping through vent opening 13.

To further minimize escape of high-velocity fluid flow through vent opening 13, diffuser 31 is preferably located over outlet 29. Diffuser 31 is comprised of wire mesh or a cover plate having a plurality of minute openings. In operation, diffuser 31 separates the overflow fuel passing through outlet 29 into smaller droplets that disperse over a wider area in fuel holding chamber 1 than would a single stream of overflow fuel. These smaller droplets are less likely to escape out of vent opening 13 upon impact with fuel holding chamber 1 than is a single fuel stream.

Connected to fuel spill transfer pipe 25, adjacent to inlet 27, is fuel drain pipe 33. Fuel drain pipe 33 receives overflow fuel that has passed through fuel spill transfer pipe 25 into fuel holding chamber 1 and drains this fuel back into the fuel tank. Fuel drain pipe 33 includes outlet 35, in communication with spill transfer pipe 25, and inlet 37. Preferably, fuel drain pipe 33 is curved such that inlet 37 is oriented substantially perpendicular to outlet 35. The length of fuel drain pipe 33 is chosen to achieve a desired height of inlet 37 above bottom 7 of fuel holding chamber 1. The height of inlet 37 above bottom 7 dictates the fuel amount (below the fuel inlet 37) that is drained out of contaminant drain opening 17.

Figure 3:
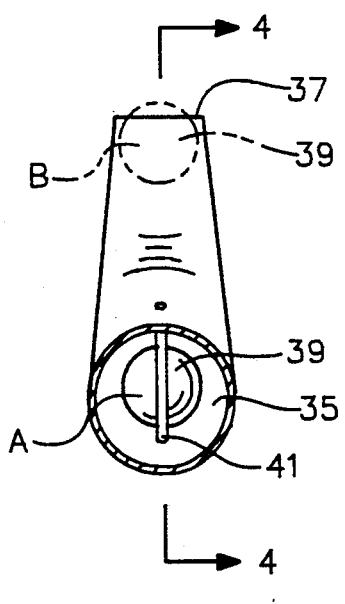
FIG. 3 is a cross-sectional view of the fuel drain pipe of the present invention taken along line 3—3 of FIG. 1.
Figure 4:
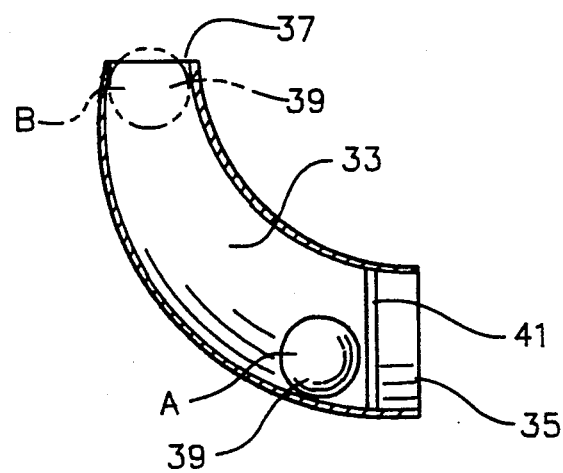
FIG. 4 is a cross-sectional view of the fuel drain pipe of the present invention taken along line 4—4 of FIG. 3.

Referring now to FIGS. 3 and 4, drain pipe sealing body 39 is located in fuel drain pipe 33. Drain pipe sealing body 39 is preferably a fuel-buoyant sphere of rubber or plastic, for example. Inlet 37 of fuel drain pipe 33 preferably has a cross-sectional area less than that of outlet 35. The diameter of drain pipe sealing body 39 is preferably less than the cross-sectional area of outlet 35 and greater than the cross-sectional area of inlet 37. Post 41 in outlet 35 retains drain pipe sealing body 39 in fuel drain pipe 33.

Thus, when no fuel is present in fuel drain pipe 33, drain pipe sealing body 39 rests against post 41 adjacent to outlet 35 (see A of FIGS. 3 and 4). When fuel fills fuel drain pipe 33 to a level substantially equal to the height of inlet 37, drain pipe sealing body 34 floats into fluid-tight engagement with inlet 37, thus sealing fuel drain pipe 33 (see B of FIGS. 3 and 4).

Referring to FIGS. 1–4, the present invention functions as follows. Attachment of the invention to the fuel tank vent pipe 23 is first described. The present invention should be attached to the vent pipe 23 such that the height of the fuel spill transfer pipe 25 and of vent pipe 23 together is less than the height of the fill pipe of the fuel tank. Preferably, the combined height of vent pipe 23 and fuel spill transfer pipe 25 should be not more than 2 feet less than the height of the fill pipe. Immediately after filling the fuel tank, fuel will also be present in the entire lengths of the fill pipe, the vent pipe 23, and the fuel spill transfer pipe 25. The two columns of fuel, one in the fill pipe and the other in the vent pipe 23 and fuel spill transfer pipe 25, will then attain equilibrium heights based on the respective pipe diameters and fuel column heights. If the fuel column height in the fuel spill transfer pipe 25 and the vent pipe 23 is less than the fuel column height in the fill pipe, then upon equilibration, fuel will flow through the fuel spill transfer pipe 25 and into fuel holding chamber 1 instead of out of the fill pipe. On the other hand, if the height of the fill pipe is less than that of the fuel spill transfer pipe 25 and vent pipe 23, fuel flow may occur through the fill pipe and into the environment as the two fuel columns attain equilibrium levels.

Operation of the present invention during the fuel filling and usage cycle of the fuel tank is next described. During filling of the fuel tank, the nozzle of the filling device is placed in the fill pipe, as described above, and fuel enters the fuel tank through the fill pipe. The air and fuel vapors in the fuel tank displaced by the fuel entering the tank pass out of vent pipe 23 through fuel spill transfer pipe 25, into fuel holding chamber 1, through vent opening 13, and into the environment.

When the fuel tank is full, fuel will enter both the fill pipe and the fuel spill transfer pipe 25. Fuel will pass out of the outlet 29 of the spill transfer pipe 25 an into fuel holding chamber 1. Fuel does not pass out of fuel drain pipe 33 because the force and the fluid level of the fuel in fuel drain pipe 33 urges drain pipe sealing body 39 into fluid-tight registration with the inlet 37 of fuel drain pipe 33. Fuel will flow through fuel spill transfer pipe 25 and collect in fuel holding chamber 1 until fuel flow into the fuel tank is terminated by manual or automatic shut-off of the fuel nozzle when the level in the fill pipe reaches the fill pipe opening. Upon fuel flow termination, as discussed above, the fuel in fuel spill transfer pipe 25 will attain an equilibrium level, presumably above the inlet 37 of fuel drain pipe 33.

After fuel flow into the fuel tank is terminated, a level of fuel will be present in fuel holding chamber 1 that is preferably higher than inlet 37 of fuel drain pipe 33, but lower than outlet 29 of fuel spill transfer pipe 25. This fuel is trapped in the fuel holding chamber 1. After a predetermined time period during which the liquid or solid contaminates in the fuel in fuel holding chamber 1 have settled, plug 19 is removed from contaminant drain opening 17 and these impurities are removed from the trapped fuel.

As fuel is withdrawn for use from the fuel tank, the level of fuel in the fuel spill transfer pipe 25 will decrease from its height above inlet 37 of fuel drain pipe 33. At this time, the fuel level in fuel drain pipe 33 will also recede below inlet 37 of drain pipe 33. The drain pipe sealing body 39 will cease to block fuel drain pipe inlet 37 as it recedes with the fluid level in fuel drain pipe 33. The trapped fuel in fuel holding chamber 1 can now enter inlet 37 of drain pipe 33, pass around drain pipe sealing body 39 (because its diameter is less than the cross-sectional area of outlet 39 of fuel drain pipe 33), enter fuel spill transfer pipe 25 at outlet 39 of fuel drain pipe 33, and reenter the fuel tank through the vent pipe 23. Fuel will flow from fuel holding chamber 1 back into the fuel tank until the fuel level in fuel holding chamber 1 is lower than inlet 37 of fuel drain pipe 33.

Note that contaminants can be drained through contaminant drain opening 17 after the fuel level in fuel holding chamber 1 has receded below inlet 37 of fuel drain 33, plug 19 is removed from contaminant drain opening 17 and impurities in the bottom of fuel holding chamber 1 are drained from fuel holding chamber 1. Note that contaminants from the fuel trapped in fuel holding chamber 1 can also be drained through contaminant drain opening 17 before the fuel level recedes below inlet 37 of fuel drain 33.

While particular embodiments of the present invention have been described in some detail herein above, changes and modifications may be made in the illustrated embodiments without departing from the spirit of the invention.

I claim:

1. A liquid spillage control apparatus adapted to be connected to a liquid tank having a ventilation opening and a fill pipe, said liquid spillage control apparatus comprising:
    a liquid holding chamber having a bottom;
    a vent opening in said liquid holding chamber for venting vapor from said liquid holding chamber; and
    a liquid spill transfer pipe for connecting said liquid holding chamber with the liquid tank ventilation opening for transfer of excess liquid from the liquid tank to said liquid holding chamber, said liquid spill transfer pipe being angled toward said bottom to direct liquid directly exiting therefrom to said bottom of said liquid holding chamber.

2. The apparatus of claim 1 wherein said spill transfer pipe has an outlet and an inlet, said outlet having a cross-sectional area less than the cross-sectional area of said inlet.

3. The apparatus of claim 1 wherein said pipe includes a liquid spill inlet and a liquid spill outlet, said apparatus further comprising:
    a liquid diffusing means on said liquid spill outlet to particulate liquid passing out of said liquid spill outlet.

4. The apparatus of claim 1 wherein said pipe includes a liquid spill inlet and a liquid spill outlet, said apparatus further comprising:
    a liquid drain pipe communicating with said pipe of said liquid spill transfer pipe, said liquid drain pipe located adjacent to said liquid spill inlet, said liquid drain pipe having an inlet and an outlet, said liquid drain pipe oriented so that liquid having greater than a predetermined level within said liquid holding chamber drains into the liquid tank through said liquid drain pipe and said liquid spill transfer means.

5. The apparatus of claim 4 wherein said liquid drain pipe inlet has a cross-sectional area less than the cross-sectional area of said liquid drain pipe outlet, said apparatus further comprising:
    a liquid-buoyant drain pipe sealing means within said liquid drain pipe, said liquid-buoyant drain pipe sealing means having a cross-sectional area greater than the cross-sectional area of said liquid drain pipe inlet and less than the cross-sectional area of said liquid drain pipe outlet; and
    a retaining means adjacent to said liquid drain pipe outlet to retain said liquid-buoyant drain pipe sealing means within said liquid drain pipe so that said liquid-buoyant drain pipe sealing means floats on liquid in said liquid drain pipe into sealing registration with said liquid drain pipe inlet and the sealing registration is maintained until the liquid level in said liquid drain pipe recedes below the liquid drain pipe inlet to allow liquid in said liquid holding chamber to flow into the liquid tank through said drain pipe inlet.

6. The apparatus of claim 5 wherein said liquid-buoyant drain pipe sealing means is a sphere.

7. The apparatus of claim 1 wherein said liquid holding chamber includes a conic-top portion.

8. The apparatus of claim 1 wherein said vent opening is covered by mesh.

9. The apparatus of claim 1 wherein said liquid holding chamber includes a bottom portion, said apparatus further comprising:
an orifice in said liquid holding chamber bottom for draining liquids and solids from said liquid holding chamber.

10. The apparatus of claim 1 wherein said vent orifice is covered by mesh.

11. A fuel spillage control apparatus adapted to be connected to a fuel tank having a ventilation opening and a fill pipe, said fuel spillage control apparatus comprising:
a fuel holding chamber;
a vent orifice in said fuel holding chamber for venting vapor from said fuel holding chamber;
a fuel spill transfer pipe having an inlet and an outlet and connecting said fuel holding chamber with the fuel tank ventilation opening for transfer of excess fuel from the fuel tank to said fuel holding chamber, whereby upon filling of the fill pipe and the fuel tank with fuel, fuel flows through said fuel spill transfer pipe and into said fuel holding chamber as the level of fuel in the fill pipe and the level of fuel in said fuel spill transfer pipe equalize;
a fuel drain pipe having an inlet and an outlet, said outlet communicating with said fuel spill transfer pipe, said fuel drain pipe oriented on said fuel spill transfer pipe so that fuel having greater than a predetermined level within said fuel holding chamber drains into the fuel tank through said fuel drain pipe and said fuel spill transfer pipe;
a fuel-buoyant drain pipe sealing means within said fuel drain pipe whereby said fuel-buoyant drain pipe sealing means floats on fuel into sealing registration with said fuel drain pipe inlet and the sealing registration is maintained until the fuel level in said fuel drain pipe recedes below the fuel drain pipe inlet to allow fuel in said holding chamber to flow into the fuel tank through the fuel drain pipe inlet; and
an orifice in said fuel holding chamber for draining liquids and solids heavier than fuel from said fuel holding chamber.

12. The apparatus of claim 11 wherein said outlet of said fuel spill transfer pipe is oriented at an acute angle relative to said inlet.

13. The apparatus of claim 12 wherein said outlet of said fuel spill transfer pipe has a cross-sectional area less than the cross-sectional area of said inlet of said fuel spill transfer pipe.

14. The apparatus of claim 11 further comprising:
a fuel diffusing means on said outlet of said fuel spill transfer pipe to particulate fuel passing out of said outlet.

15. The apparatus of claim 11 wherein said inlet of said fuel drain pipe has a cross-sectional area less than the cross-sectional area of said outlet of said fuel drain pipe and said fuel-buoyant drain pipe sealing means is a sphere having a cross-sectional area greater than the cross-sectional area of said inlet of said fuel drain pipe and less than the cross-sectional area of said outlet of said fuel drain pipe, said apparatus further comprising:
a retaining means adjacent to said outlet of said fuel drain pipe to retain said fuel-buoyant sealing means within said fuel drain pipe.

16. The apparatus of claim 11 wherein said fuel drain pipe inlet is oriented substantially perpendicular to said fuel drain pipe outlet.

17. The apparatus of claim 11 wherein said fuel holding chamber includes a conic-top portion.

18. A liquid containing and liquid spillage control apparatus comprising:
a tank for holding liquid, said tank having a ventilation opening and a fill pipe;
a liquid spillage chamber, said liquid spillage chamber having a bottom, a vent opening and a liquid spill transfer pipe for connecting said ventilation opening of said tank with said liquid spillage chamber for transfer of excess liquid from the liquid tank to said liquid spillage chamber, said liquid spill transfer pipe including an orifice having a cross-sectional area less than the cross-sectional area of said fill pipe and having a liquid spill inlet and a liquid spill outlet, said liquid spill outlet being angled toward said bottom to direct liquid to said bottom of said liquid spillage chamber.

19. The apparatus of claim 18 wherein said liquid spill transfer pipe includes a liquid spill inlet and a liquid spill outlet, said apparatus further comprising:
a liquid drain pipe communicating with said liquid spill transfer pipe, said liquid drain pipe located adjacent to said liquid spill inlet, said liquid drain pipe oriented so that liquid having greater than a predetermined level within said liquid holding chamber drains into the liquid tank through said liquid drain pipe and said liquid spill transfer means.

20. The apparatus of claim 19 wherein said liquid drain pipe inlet has a cross-sectional area less than the cross-sectional area of said liquid drain pipe outlet, said apparatus further comprising:
a liquid-buoyant drain pipe sealing means within said liquid drain pipe, said liquid-buoyant drain pipe sealing means having a cross-sectional area greater than the cross-sectional area of said liquid drain pipe inlet and less than the cross-sectional area of said liquid drain pipe outlet; and
a retaining means adjacent to said liquid drain pipe outlet to retain said liquid-buoyant drain pipe sealing means within said liquid drain pipe so that said liquid-buoyant drain pipe sealing means floats on liquid in said liquid drain pipe into sealing registration with said liquid drain pipe inlet and the sealing registration is maintained until the liquid level in said liquid drain pipe recedes below the liquid drain pipe inlet to allow liquid in said liquid holding chamber to flow into the liquid tank through said drain pipe inlet.

21. The apparatus of claim 20 wherein said liquid-buoyant drain pipe sealing means is a sphere.

22. The apparatus of claim 18 wherein said liquid holding chamber includes a conic-top portion.

23. The apparatus of claim 18 wherein said opening for venting vapor is covered by mesh.

24. The apparatus of claim 18 wherein said liquid holding chamber includes a bottom portion, said apparatus further comprising:
an orifice in said liquid holding chamber bottom for draining liquids and solids from said liquid holding chamber.

25. A liquid spillage control apparatus adapted to be connected to a liquid tank having a ventilation opening and a fill pipe, said liquid spillage control apparatus comprising:

a liquid holding chamber having an upper end;

an opening in said liquid holding chamber for ventilating vapor from said liquid holding chamber;

a liquid spill transfer pipe adapted to connect said liquid holding chamber with the liquid tank ventilation opening for transfer of excess liquid from the liquid tank to said liquid holding chamber; and a liquid drain pipe communicating with said liquid spill transfer pipe, said liquid drain pipe angled toward said upper end of said liquid holding chamber on said liquid spill transfer pipe so that liquid having greater than a predetermined level within said liquid holding chamber drains into the liquid tank through said liquid drain pipe and said liquid spill transfer pipe.

26. The apparatus of claim 25 wherein said pipe includes a liquid spill inlet and a liquid spill outlet, said liquid spill outlet being angled relative to said liquid spill inlet to direct liquid into said liquid holding chamber.

27. The apparatus of claim 20 wherein said liquid spill outlet has a cross-sectional area less than the cross-sectional area of said liquid spill inlet.

28. The apparatus of claim 25 wherein said pipe includes a liquid spill inlet and a liquid spill outlet, said apparatus further comprising:

a liquid diffusing means on said liquid spill outlet to particulate liquid passing out of said liquid spill outlet.

29. The apparatus of claim 28 wherein said liquid drain means is a liquid drain pipe that has an inlet with a cross-sectional area less than the cross-sectional area of the outlet of said drain pipe, said apparatus further comprising:

a liquid-buoyant drain pipe sealing means within said liquid drain pipe, said liquid-buoyant drain pipe sealing means having a cross-sectional area greater than the cross-sectional area of said liquid drain pipe inlet and less than the cross-sectional area of said liquid drain pipe outlet; and a retaining means adjacent to said liquid drain pipe outlet to retain said liquid-buoyant drain pipe sealing means within said liquid drain pipe so that said liquid-buoyant drain pipe sealing means floats on liquid in said liquid drain pipe into sealing registration with said liquid drain pipe inlet and the sealing registration is maintained until the liquid level in said liquid drain pipe recedes below the liquid drain pipe inlet to allow liquid in said liquid holding chamber to flow into the liquid tank through said drain pipe inlet.

30. The apparatus of claim 29 wherein said liquid-buoyant drain pipe sealing means is a sphere.

31. The apparatus of claim 25 wherein said liquid holding chamber includes a conic-top portion.

32. The apparatus of claim 25 wherein said opening for venting vapor is covered by mesh.

33. The apparatus of claim 25 wherein said liquid holding chamber includes a bottom portion, said apparatus further comprising:

an orifice in said liquid holding chamber bottom for draining liquids and solids from said liquid holding chamber.

* * * * *